June 9, 1942. H. E. VEIT 2,285,690
WIRE FEEDING DEVICE
Filed July 16, 1941
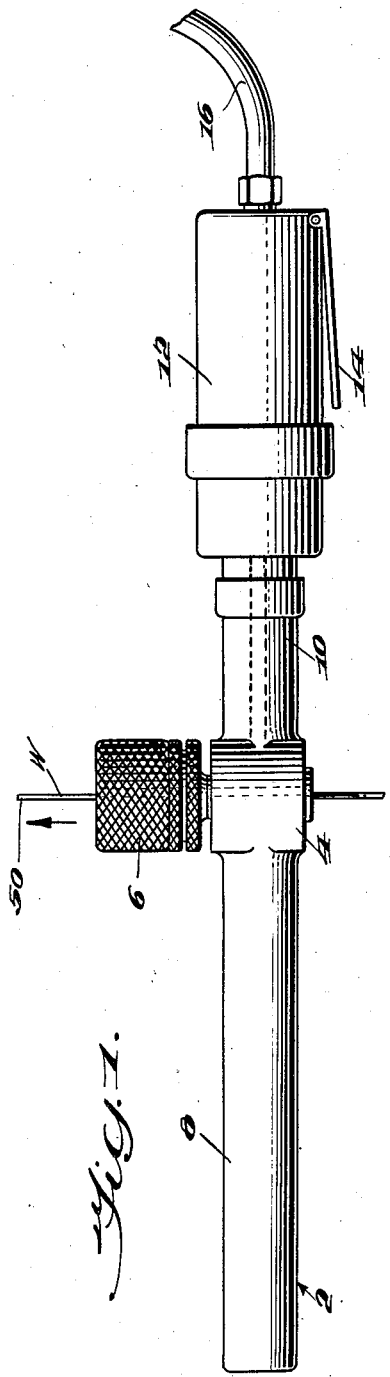
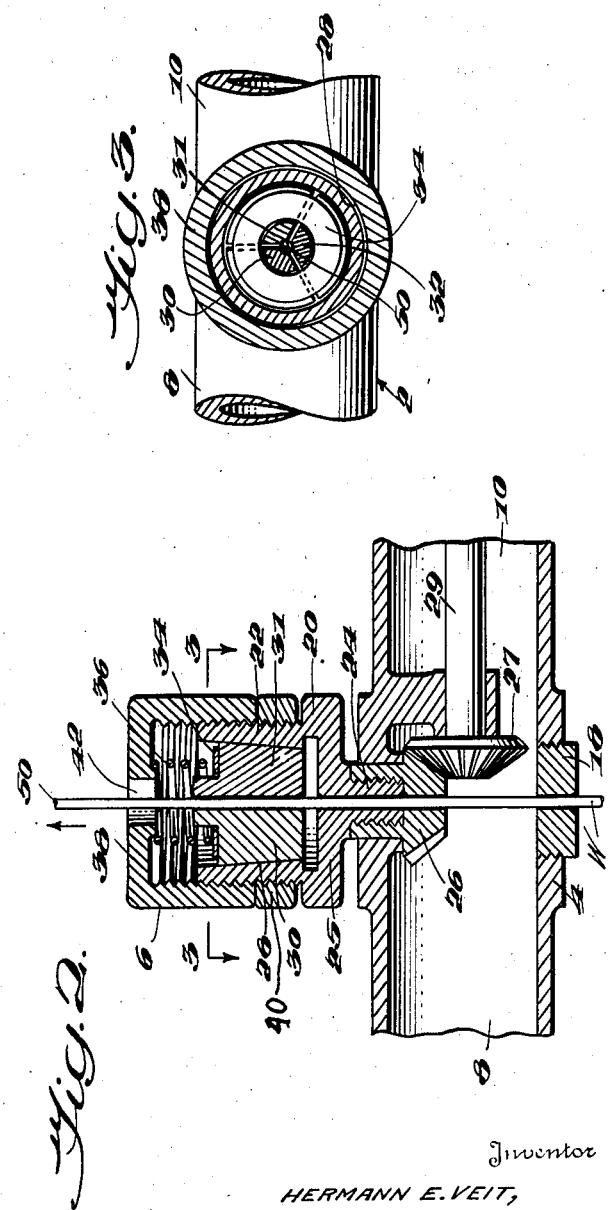
Inventor
HERMANN E. VEIT,
By
Attorney Patented June 9, 1942

2,285,690

UNITED STATES PATENT OFFICE 2,285,690

WIRE FEEDING DEVICE

Hermann E. Veit, Parkville, Md., assignor to The Glenn L. Martin Company, Baltimore, Md.

Application July 16, 1941, Serial No. 402,710

3 Claims. (Cl. 140—125)

This invention is directed to a wire feeding device. More particularly the invention is directed to a mechanism for pushing wires through conduits or hinges.

In many instances, for example in the construction of aircraft, it is necessary to push wires through pipes or conduits, and also through long so-called piano hinges. Generally the insertion of a single wire requires the combined efforts of several men and the consumption of considerable time.

An object of this invention is to construct a mechanism for readily pushing a wire through a tube or hinge.

Another object of the invention is to construct a manually operated tool with a power wire twisting mechanism for pushing a wire through a tube.

Another object of the invention is to produce a wire feeding device manually operated by one person.

Another object of the invention is to produce a simple lightweight device easily operable by one person close to the workpiece for inserting a wire into the workpiece by using short reciprocating strokes of the device.

Generally these and other objects of the invention are obtained by mounting upon a handle a revolvable chuck through which the wire is passed, the chuck jaws being engageable with the wire only when the chuck is moved in the direction it is desired to feed the wire. The chuck is rotated by a motor which may be located in the handle. A person holding the device by the handle, pushes it in the direction the wire is to be fed, thus causing the chuck to engage the wire and twist it, while pushing it in that direction.

The means by which the objects of the invention are obtained are more fully described with reference to the accompanying drawing in which:

Fig. 1 is a side elevation view of the wire feeding device;

Fig. 2 is an enlarged cross-sectional view of a portion of the device of Fig. 1; and Fig. 3 is a cross-sectional view taken on the plane indicated at 3—3, Fig. 2.

As shown in Fig. 1, the device is composed of a hollow round bar 2 having a flattened section 4 upon which a rotatable chuck 6 is mounted. The portions 8 and 10 of bar 2 on opposite sides of section 4, form handles for manually grasping the device. Portion 10 includes a slightly enlarged part 12 which houses a motor operable by trigger 14 and supplied with power through cable 16. Conventional small electric or compressed air motors are available for this purpose.

An opening extends through section 4 transversely of bar 2, two coaxial holes thus being formed in the bar. In one of these is placed a plug 18 having a central opening therein through which the wire W is adapted to be passed. The chuck 6 is mounted in the oppositely disposed opening.

Chuck 6 is composed of a member 20 including an exteriorly threaded cylinder 22 and a smaller exteriorly threaded plug 24 projecting from the closed end 25 of cylinder 22. Plug 24 extends through the other of the openings and has a bevel gear 26 threaded thereto from the interior of bar 2, this connection forming a means for journaling the chuck for rotation in section 4. Gear 26 is driven by gear 27 connected by shaft 29 to the motor.

The inner wall 28 of cylinder 22 is conical and converges toward the plug 24. Slidably mounted within cylinder 22 are chuck jaws 30, 31, and 32, respectively, each having its exterior surface inclined as the surface 28 of cylinder 22, and each jaw having a small neck at its outer end. The jaws are held loosely in position by a washer 34 surrounding the necks. A spring 36, extending between inwardly flanged nut 38 and washer 34, urges the jaws into normal wedging relation with a wire adapted to extend between the jaws. Nut 38, and associated lock nut 40, are threaded to the exterior of cylinder 22.

Bevel gear 26 and plug 24 are centrally bored to form openings coaxial with the opening in plug 18. The jaws 30, 31, and 32 are grouped about the axis of these openings. Flanged nut 38 likewise has an enlarged coaxial opening 42 therein.

The operation of this wire feeding device is as follows:

The wire W is threaded through the plug 18 and the openings aligned therewith until it projects outwardly of nut 38. Movement of the wire between jaws 30, 31, and 32 pushes the jaws against spring 36, the jaws separating slightly by sliding on surface 28 and moving out of wedging relation so that the wire can pass between them.

The operator then manually grasps the handles 8 and 10, and inserts the free end 50 of the wire into the opening of the tube or hinge into which the wire is to be inserted. The trigger 14 is pressed by the operator and the motor started, thus revolving chuck 6 by the rotation of shaft 29 and gears 26 and 27. As the jaws 30, 31, and 32 engage the wire W because of the pressure of spring 36, wire W is gripped and rotated. The operator then pushes the rotating wire into the opening, in the direction indicated by the arrows, Figs. 1 and 2, until the nut 38 is stopped by some obstruction, for example the end of the conduit or hinge.

Then the operator pulls the device back. As the wire is held in the hole into which it has been pushed, jaws 30, 31, and 32 are pulled, against the pressure of spring 36, out of wedging engagement with wire W. Further forward movement of the device in the direction of the arrows then causes the jaws to grip a new portion of the wire, and rotate it as it is being pushed into the conduit or hinge. Consequently, with short reciprocating strokes of the device, a long length of wire can be fed into the conduit or hinge.

Experience has shown that by the best previously known method of feeding wire consisted in using the combined efforts of several men to hold the wire straight while pushing it into a conduit or hinge, the wire being turned by a motor driven chuck fastened to the extreme free end of the wire. By using the wire feeding device of this invention one man is able to do the same work at a greatly increased rate of speed. The device therefore produces results not heretofore obtained in the art.

Having now described a means by which the objects of the invention are obtained, I claim:

1. A wire feeding device comprising an elongated, hollow handle bar; an opening transversely extending through the central portion of said bar; a chuck rotatably mounted on said handle bar and journaled into said opening; a gear affixed to the portion of the chuck extending into said hollow handle bar; a motor mounted in one end of said hollow handle bar having a drive shaft and pinion driven thereby and meshing with said gear for rotating the same, the said chuck having a passage therethrough in alignment with said opening in the handle bar whereby a wire may be threaded through said handle bar and chuck; a plurality of wedge-shaped jaws in said chuck normally spring pressed to grip the wire when the handle bar is manually moved forward to feed the wire and for releasing the said wire when the handle bar is moved in the opposite direction.

2. A wire feeding device as set forth in claim 1, wherein the gear affixed to the portion of the chuck extending into the hollow handle bar is provided with an integral internally threaded stem threaded over the said chuck extension whereby the top of said gear abuts the inner wall of the hollow handle bar and maintains the said chuck in position thereon.

3. A wire feeding device as set forth in claim 1, wherein the top surface of the said gear affixed to the portion of the chuck extending into the hollow handle bar secures the chuck on the said bar and the wire to be fed passes through an axial bore passing through the said gear in alignment with the transverse opening extending through the central portion of the handle bar.

HERMANN E. VEIT.